United States Patent [19]

Fukuda et al.

[11] Patent Number: 4,576,457
[45] Date of Patent: Mar. 18, 1986

[54] MOTOR DRIVEN WINDING MECHANISM FOR CAMERA

[75] Inventors: Tsuyoshi Fukuda, Kanagawa; Yoshihiko Aihara, Tokyo, both of Japan

[73] Assignee: Canon Kabushiki Kaisha, Japan

[21] Appl. No.: 696,741

[22] Filed: Jan. 31, 1985

[30] Foreign Application Priority Data

Feb. 3, 1984 [JP] Japan .............................. 59-14829[U]

[51] Int. Cl.⁴ .............................................. G03B 1/18
[52] U.S. Cl. .............................. 354/173.11; 354/213; 354/214
[58] Field of Search ................ 354/173.1, 173.11, 212, 354/213, 214, 217, 218

[56] References Cited

U.S. PATENT DOCUMENTS

| | | | |
|---|---|---|---|
| 3,946,409 | 3/1976 | Toyoda | 354/173.11 |
| 4,367,026 | 1/1983 | Terada et al. | 354/173.11 |
| 4,494,842 | 1/1985 | Kimura et al. | 354/173.11 |
| 4,525,048 | 6/1985 | Wong et al. | 354/173.1 |

FOREIGN PATENT DOCUMENTS 53-39123 4/1978 Japan .

*Primary Examiner*—Russell E. Adams
*Attorney, Agent, or Firm*—Toren, McGeady, Stanger, Goldberg & Kiel

[57] ABSTRACT

Rotation control of a motor used as a drive source in a motor driven winding-up mechanism for a camera. By rotating the reversible motor in a forward direction, the winding-up transmission mechanism moves. When the film has been wound up by one frame, the reversible motor rotates in the opposite direction a minute angle.

11 Claims, 9 Drawing Figures

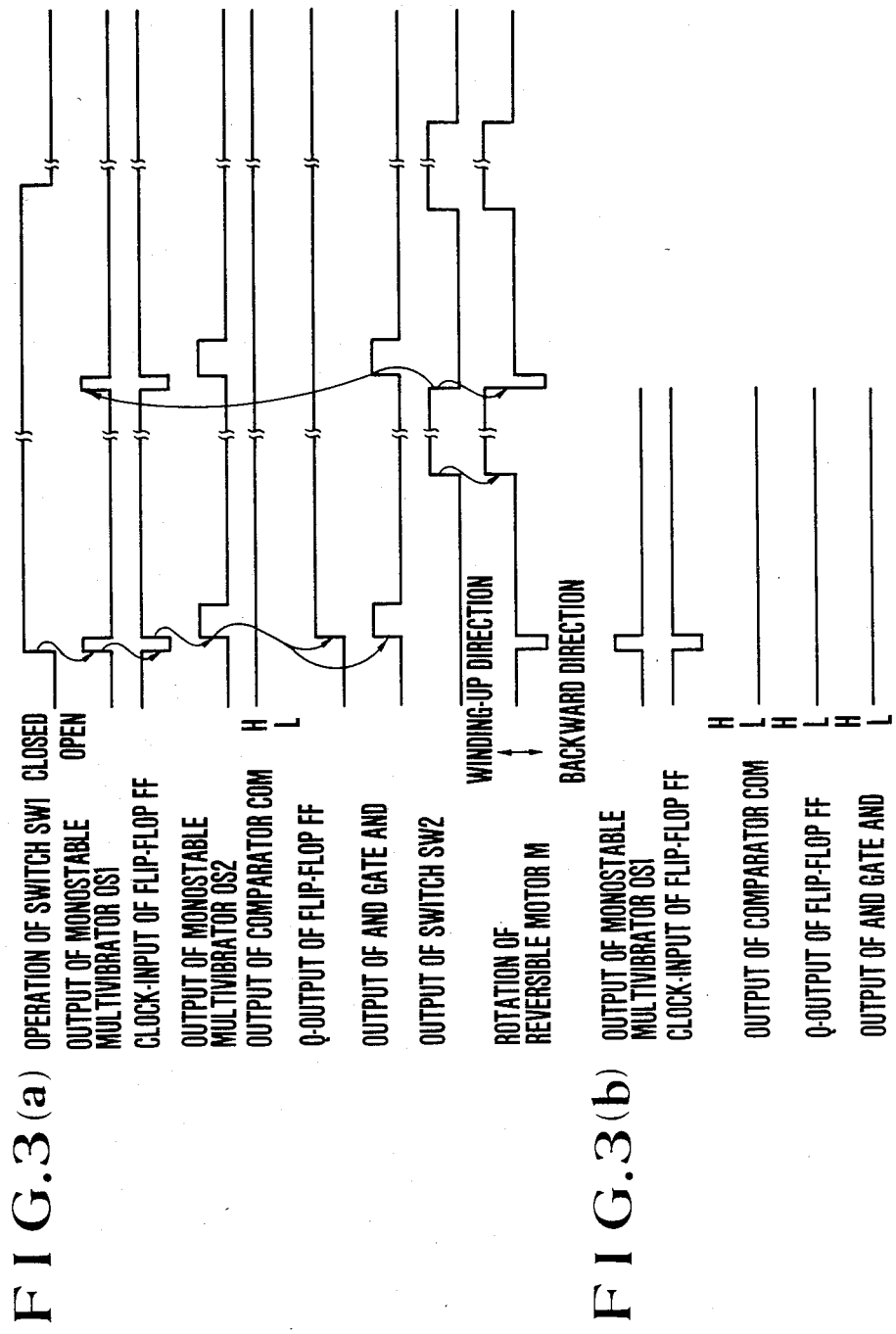

MOTOR DRIVEN WINDING MECHANISM FOR CAMERA

BACKGROUND OF THE INVENTION

1. Field of the Invention

This invention relates to motor driven winding-up mechanisms for cameras and more particularly controls rotation of the motor.

2. Description of the Prior Art

In the conventional motor driven winding-up mechanism for a camera, when the film has been wound-up one frame, the stopping member latches the driving torque transmission system for the sprocket and the takeup spool so that their rotation is stopped. And, at the same time the current supplied to the motor is stopped. With this, however, because the inertia of the motor and transmission system is retained in the form of stress at the various members of the transmission system and the stopping member, to initiate the next cycle of the winding operation, since the heavy overload lies on the stopping member, the required magnitude of force for releasing the transmission system from the locking connection is very large. This problem becomes serious when a series of continuous shots are to be made. If the winding-up stopping member is not smoothly moved away from the transmission system, the time interval between the successive two shots is randomly varied to a great extent.

To improve this, a previous proposal is shown in FIG. 5 where an automatic winding-up unit 102 for a camera 101 includes an electric motor 103, and gears 104 to 108 constitute a transmission system, which terminates at a female coupler 109 engaging a male coupler 110 within the camera housing. The gears 106 and 107 are connected to each other by a shaft 111 on which are mounted a fly wheel 112 and a coil spring 113. Based on this proposal, at the termination of the winding-up operation, the inertia of the transmission system allows the fly wheel 112 to further rotate while charging the spring 113. After the torque of the fly wheel 112 has been balanced with the bias force of the spring 113, it rotates in the reverse direction, whereby the overload on the coupler 110 is removed. By this method, however, it takes the fly wheel 112 a long time to rest so that when a series of continuous shots is taken, it cannot fully function. Moreover, an alternative problem which is produced is that the production cost is increased by the increased number of parts, and the size of the drive or wind-up unit 102 is increased.

Another proposal in U.S. Pat. No. 4,182,562 is that after termination of each cycle of winding, the motor is over-driven by using a delay means so that the driving torque transmission and the winding-up stopping member are given an excessive load. Then, the reaction of their strain produces a discouraging effect. However, this method requires that the transmission system and the stopping member be made of elastic material. Another disadvantage is that with the battery to dropped voltage, the large overload is unsolved, or rather intensified.

Also, Japanese Laid-Open Patent Application No. SHO 53-39123 purposes the use of an electromagnetic clutch to stop rotation of the motor just when the winding-up operation terminates resulting in no overload is given to the transmission system and the stopping member. This method, however, has the disadvantage that the usable electromagnetic clutch is very expensive and large.

An object of the present invention is to provide a motor driven winding-up mechanism for a camera in which the stress resulting from the inertia of the motor when the winding is completed is removed by very simple means and low cost. Thereby it is possible to make a series of continuous shots smoothly.

Other objects of the invention will become apparent from the following detailed description thereof.

SUMMARY OF THE INVENTION

A motor driven winding-up mechanism for a camera including an electric motor, a drive circuit for rotating the motor in a winding-up direction, a film winding-up member, a transmitting and driving system for transmitting rotation of the motor to the film winding-up member, winding-up stopping means for stopping rotation of the motor and the transmitting and driving system each time a film has been wound up by a prescribed number of frames, and backward motion driving means for driving at least the transmitting and driving system to rotate to a few degrees of angle in the reversed direction to that in which it rotated when in winding at a time after the film has been wound up by the prescribed frame and before the initiation of the next film frame winding operation.

BRIEF DESCRIPTION OF THE DRAWINGS

FIGS. 3(a) and 3(b) are pulse timing charts illustrating the manner in which the circuit of FIG. 2 operates.

DETAILED DESCRIPTION OF THE PREFERRED EMBODIMENT

The present invention will next be described by reference to the drawings.

Figure 1:
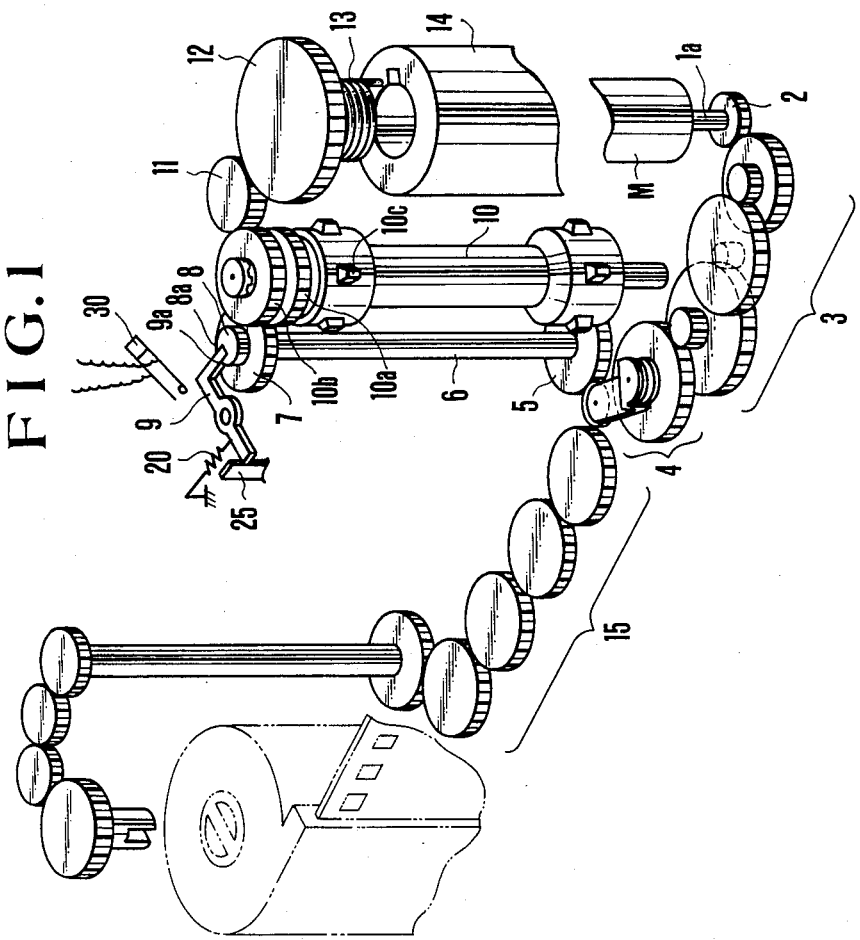
FIG. 1 is a perspective view of a driving torque transmission system in a camera having a motor driven winding-up mechanism according to the present invention.

In FIG. 1 there is shown one embodiment of a motor driven winding-up mechanism according to the present invention in which a reversible motor M which can change the direction of rotation between forward and reverse depending on the direction of flow of driving current thereto, has an output shaft $1a$ on which is fixedly mounted a pinion gear 2. A gear train 3, a planetary gear mechanism 4 capable of selectively cooperating with a gear 5 and a film rewinding gear train 15 depend on the forward and reverse directions of rotation of the motor 1 respectively, and a gear 7 fixedly mounted on a common shaft 6 of the gear 5, constitute a driving torque transmission system. A cam disc 8 is coaxially fixedly mounted on the upper surface of the gear 7 and rotates one revolution for each film winding frame. Formed in the peripheral surface of this cam disc 8 is a cutout $8a$ and the cam 8 displacement is synchronized with the termination of each winding cycle. A swingable winding-up stopping lever 9 is urged by a spring 20 so that its one end or probe portion $9a$ always abuts the periphery of the cam disc 8. When the probe $9a$ drops in the cutout $8a$, the lever 9 turns clockwise.

When a shutter release is actuated, on the other hand, as the mirror moves upward, a return control lever 25 moves while turning the lever 9 in a counter-clockwise direction. A switch 30 for detecting when the winding is completed is adjacent to the winding stop lever 9 and is closed when the winding operation is in progress, and is to open when it is terminated. A sprocket 10 having teeth 10c for engagement in the perforations of the film is fixedly mounted on a common shaft of a gear 10a which meshes with the gear 7. Another gear 10b is drivingly connected through an intermediate gear 11 to a spool gear 12. Rotation of the spool gear 12 is transmitted through a friction mechanism 13 to a takeup spool 14 on which the film is wound up. Reference numeral 15 identifies a film rewinding transmission gear train.

Figure 2:
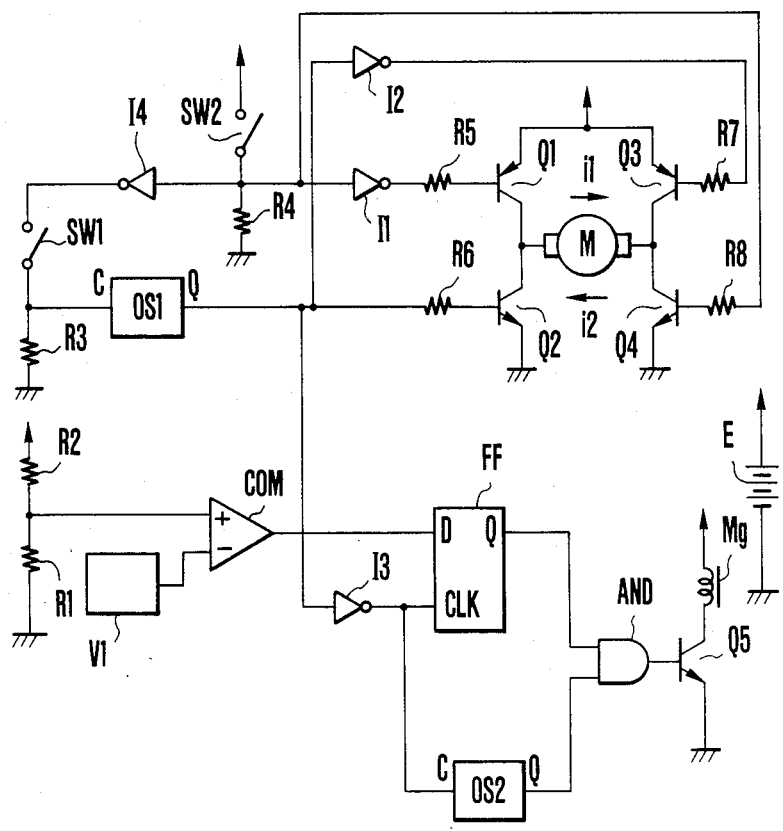
FIG. 2 is an electrical circuit diagram of a control circuit of the reversible motor of FIG. 1.
Figure 4A:
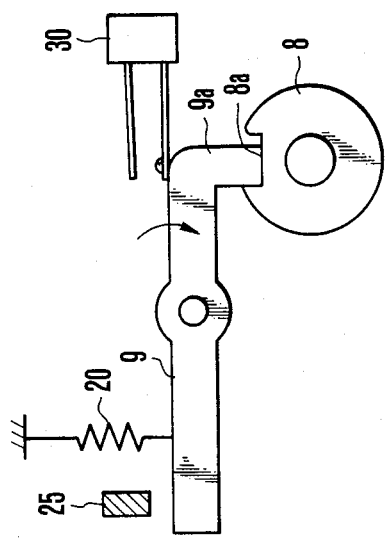
FIGS. 4(a) to 4(d) are elevational views of the winding-up stopping means in different operative positions.
Figure 4B:
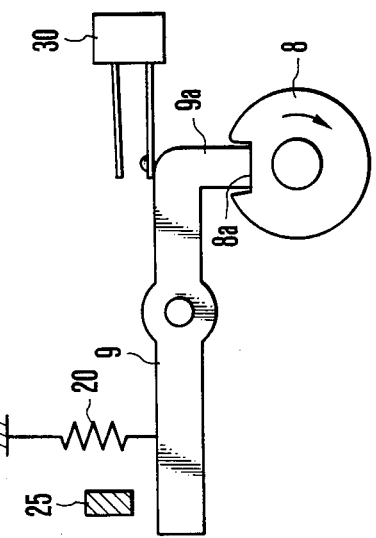
Figure 4C:
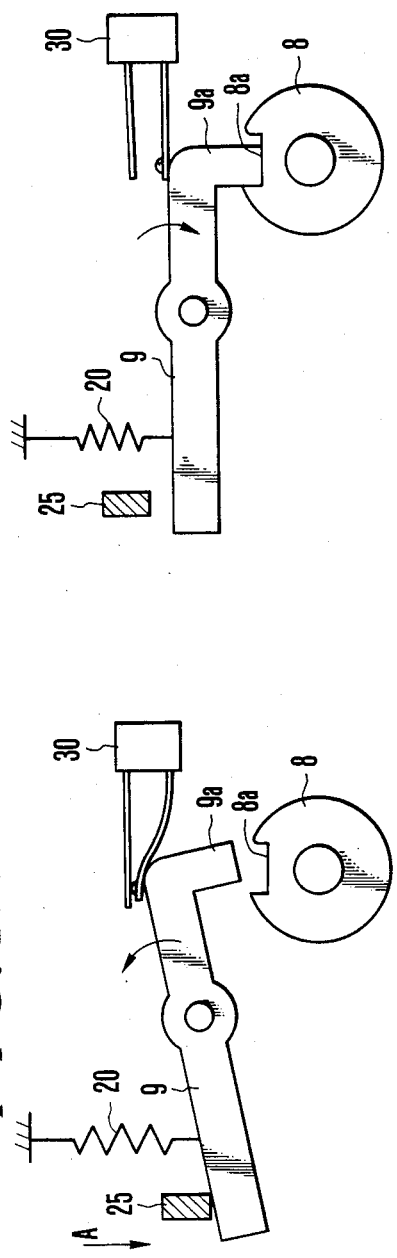
Figure 4D:
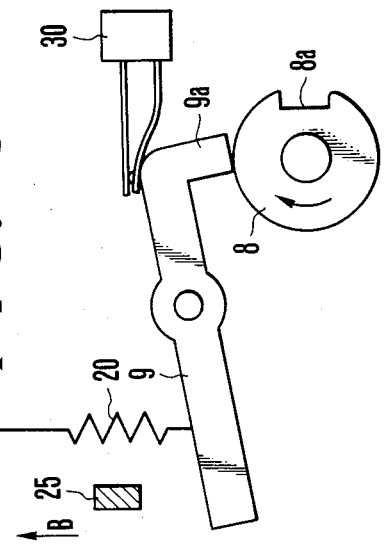
Figure 5:
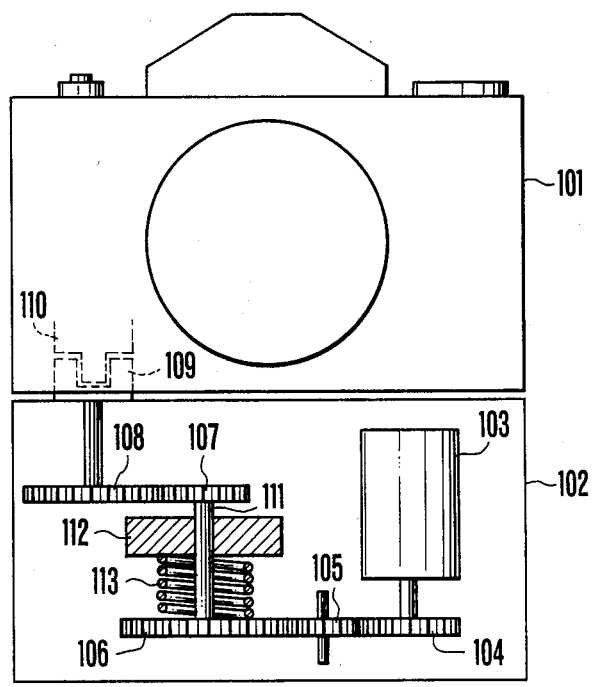
FIG. 5 is a sectional view of the combined main parts of the conventional automatic winding-up unit and the camera.

FIG. 2 illustrates a control circuit for the reversible motor M in an embodiment of the present invention. Reference numerals R1-R8 identify resistors; a switch SW1 responsive to a stroke on a release button (not shown); switch SW2 is controlled by the switch 30 of FIG. 1 and a signal from a circuit (not shown) for controlling the trailing curtain of the shutter so that when the trailing curtain has run down, it closes, and when the winding is completed, it opens in time with the opening of the switch 30. Reference symbol Mg identifies a release start magnet reference symbols OS1 and OS2 identify mono-stable multivibrators. The multivibrator OS1 produces a pulse of very short duration necessary to check the current supply at the time of release, and the multivibrator OS2 produces a pulse of a duration necessary to activate the release start magnet Mg; I1–I4 identify inverters; COM identifies a comparator; M the reversible motor M of FIG. 1; Q1–Q5 transistors; E an electrical power source or battery; AND an AND gate; V1 a constant voltage source; and FF identifies a D type flip-flop.

The operation of the mechanism of FIG. 1 and the circuit of FIG. 2 are next described by reference to the pulse timing charts of FIGS. 3(a) and 3(b) and the operative positions of the essential parts to an enlarged scale in FIGS. 4(a) to 4(d).

When the switch SW1 is closed in response to actuation of a camera release, a signal that rises from L to H is applied to the input terminal of the mono-stable multivibrator OS1, whereby a pulse which is maintained at H for a prescribed time is produced from the mono-stable multivibrator OS1. This pulse signal H is then applied to the base of the transistor Q2 while the base of the transistor Q3 is supplied with a signal L through the inverter I2. Since the transistors Q2 and Q3 are ON, the reversible motor M is supplied with current flowing in a direction indicated by i2. Thus, the motor M rotates in direction opposite to the winding-up direction. It should be pointed out that this backward rotation of the motor M operates only for a very short time equal to the width of the pulse from the mono-stable multivibrator OS1.

Meanwhile, the pulse signal H from the aforesaid mono-stable multivibrator OS1 is applied through the inverter I3 to a clock input terminal CLK of the D type flip-flop FF. In time with the change of level of the pulse signal from H to L, or, for the clock input terminal CLK, the rise from L to H, the output signal from the comparator COM as applied to a data input terminal D is latched. Since an actual volage VE of the battery E after having been divided by the resistors R1 and R2 to a value:

$$VE \frac{R1}{R1 + R2},$$

is applied to the non-inverting input terminal of the comparator COM, and a reference voltage VREF from the constant voltage source V1 is applied to the inverting input terminal thereof, the output of the comparator COM reaches H level when $$VE \frac{R1}{R1 + R2} > VREF, \text{ or } VE > VREF \frac{R1 + R2}{R1},$$

and L level when $$VE < VREF \frac{R1 + R2}{R1}.$$

It is to be noted here that the value of the reference voltage VREF is determined to assure the reliability of exposure control with the accompaniment of the release operation and control of movement of the shutter curtains, and, therefore that when the condition $$VE > VREF \frac{R1 + R2}{R1}$$

is satisfied, or the comparator COM produces the signal H, the photographic operation is normal. When $$VE < VREF \frac{R1 + R2}{R1},$$

the battery E must be replaced.

Now assuming that the voltage of the battery E is so high that the comparator COM produces an H level output signal as shown in FIG. 3(a), the condition $$VE > VREF \frac{R1 + R2}{R1}$$

is satisfied. Having latched this signal, the D type flip-flop FF changes its Q output to an H level. This output is applied to one input terminal of the AND gate AND. Since the output of the mono-stable multivibrator OS2, which is applied to the other input of the AND gate AND rises in synchronization with the aforesaid latching operation, the AND gate AND then produces an output of the same waveform as that of the output of the mono-stable multivibrator OS2. By this pulse signal H from the AND gate AND, the transistor Q5 is turned on the energize to release start magnet Mg. After that, the various mechanisms of the camera operate in sequence to release the shutter. Note, with the switch SW1 continuously closed, its output takes an H level intermittently as the ON-to-OFF operation of the switch SW2 is recycled. This results in automatically making a series of continuous shots.

Alternatively, assuming that as the voltage of the battery E becomes low, $$VE < VREF \frac{R1 + R2}{R1}$$

results, then the comparator COM produces an L level output signal, as shown in FIG. 3(b). Having latched this signal, the D type flip-flop FF gives its Q output of L level to the AND gate AND. Therefore, the output of the AND gate AND is maintained at an L level, preventing the release start magnet Mg from being actuated.

Therefore, only when the voltage of the battery E is sufficiently high, a sequence of operations to a shutter release can be carried out. Next the winding operation that follows the termination of the release operation will be explained by reference to FIG. 3(a). That is, as the release operation nears the terminal end, when the trailing curtain of the shutter runs down, the switch SW2 is closed. In response to this, the inverter I1 produces an L level output which is then applied to the base of transistor Q1, thereby the transistor Q1 is turned on, while the output of the switch SW2 is applied to the base of the transistor Q4 whereby the transistor Q4 too is turned on. Therefore, the reversible motor M is supplied with current flowing in another direction i1, rotating forward. This forward rotation of the motor M continues until the switch SW2 is opened as the film is advanced one frame, sensed by the switch 30 of FIG. 1.

Operation of the winding-up transmission system based on the operation of the reversible motor M will be first explained in connection with the forward rotation of the reversible motor M for the purpose of better understanding. That is, as the releasing operation goes on, when the mirror (of the single lens reflex camera) moves upward, the return control lever 25 moves in a direction indicated by arrow A in FIG. 4(a), thereby the winding stop lever 9 is turned in a counterclockwise direction, and the probe 9a is disengaged from the cutout 8a of the cam disc 8. Such counterclockwise movement of the stop lever 9 also causes closure of the switch 30. And, in the next step of the releasing operation, the return control lever 25 moves backward or in a direction indicated by arrow B in FIG. 4(b), allowing a later clockwise movement of the stop lever 9. When the releasing operation reaches the final step, or the trailing curtain of the shutter has run down, the switch SW2 is closed, causing the reversible motor M to rotate in the winding-up direction. Rotation of the motor M is transmitted through the pinion gear 2, the gear train 3, the planetary gear mechanism 4, the shift gears 5 and 7, the gear 10a, the sprocket 10, the gear 10b, the gear 11, and the spool gear 12 in this order to the spool 14 to take up the advanced film thereon. During this winding-up operation, the cam disc 8 also rotates. When the film is advanced one frame, the probe 9a of the winding-up stop lever 9 then drops in the cutout 8a. As this winding-up stop lever 9 turns in the clockwise direction, the switch 30 opens itself, and also the switch SW2. Thus, one cycle of the film winding operation is completed. It should be recognized here that just after the motor M has been de-energized, a constraining force is exerted between the probe 9a of the winding-up stop lever 9 and the cutout 8a of the cam disc 8 by the inertia of the over-running motor M and the various gears of the transmission system. If this constraining force is retained, a large force would be necessary to turn the winding-up stop lever 9 in the counterclockwise direction when the cam disc 8 is released from latching connection therewith.

According to the present invention, however, when making the next shot, depression of the release button closes the SW1 switch which in turn causes the monostable multivibrator OS1 to energize the reversible motor M for a very short time equal to the width of the pulse produced therefrom before initiation of actual photography (the leading curtain of the shutter runs down). The motor M rotates a minute angle backward along with the cam disc 8 from the position of FIG. 4(c) to a position of FIG. 4(d) where the winding-up stop lever 9 is released from the clamping connection with the cutout 8a. This provides assurance that considerably reduced power of the return control lever 25 suffices for controlling the counterclockwise movement of the winding-up stop lever 9 accurately and reliably.

In the embodiment, the planetary gear mechanism 4 is used as a part of the transmission system. Therefore, excessive backward rotation of the motor M brings the planetary gear into engagement with the rewinding transmission gear train 15, as it revolves around the sun gear. It is therefore understood that not only the stress of the transmission system is immediately released after termination of each cycle of winding but there is also no possibility of bringing the opposite shoulder of the cutout 8a into bracing engagement with the probe 9a of the winding-up stop lever 9.

Note, even without the use of the planetary gear mechanism 4 in the transmission system, it is needless to say that an equivalent effect can be obtained because the strain-clamping force is loosened by the backward rotation of the motor M, if the amount of backward rotation is adjusted with great accuracy.

It will be appreciated from the illustrated embodiment that the stress of the sprocket control mechanism (the winding-up stop lever 9 and the cam disc 8) has constituted a problem with cameras having the conventional motor driven winding-up mechanism which is released without employing a new mechanical part. In a simple method the reversible motor M is rotated backward to a small angle after the stoppage of all the members of the winding-up mechanism that follows winding completion. By this feature of the invention it is possible not only to smoothly operate the sprocket control mechanism but also to insure that when making a series of continuous shots, the time interval between the successive shots can be accurately controlled.

It is to be noted that in this embodiment, whether or not the actual voltage of the electrical power source or battery E is above a satisfactory level for each operation to release the shutter is checked in coincidence with the releasing of the stress described above. Since no time space the voltage checking solely occupies is not introduced into the sequence of operations of the camera, the minimum time gap between the successive two shots can be shortened.

Though the foregoing embodiment has been described as the one-frame advance control means taking the form of the winding-up stop member (the combination of the lever 9 and the cam disc 8), another form, for example, an electrically operated braking mechanism may be employed so that the stoppage of the sprocket is controlled only electrically.

Also though in the above-described embodiment the backward motion imparting means for rotating the transmission system backward to a small angle each time the film has been advanced one frame is formed by reversing the rotation of the motor as the winding-up power source, another method, for example, by using an additional motor solely used for film rewinding, may be used. In this case, this rewinding motor is rotated in a rewinding direction to a small angle each time the winding is completed.

Also, in the invention, the winding-up stopping means is not necessarily operated for every one frame, but another embodiment in which the stopping means is actuated after two or more frames have been advanced is also possible to obtain an equivalent effect to that in the above-described embodiment.

As has been described above, the present invention provides the possibility of smooth continuity of motorized shootings by removing the stress that has been introduced by the inertia of the motor and the torque transmission system when the winding operation is completed in such a way that for every one frame of film to be advanced, after the preceding cycle of energization of the motor for driving the torque transmission system was terminated, said transmission system is turned backward to a small angle by the backward motion driving means.

As compared with the prior known methods of removing the stress, therefore, the use of means of low cost and simple structure makes it possible to provide a motor driven winding-up mechanism for a camera of remarkably improved capabilities.

What is claimed is:

1. A motor driven winding-up mechanism for a camera comprising:
   (a) an electric motor;
   (b) a drive circuit for rotating said motor in a winding-up direction;
   (c) a film winding-up member;
   (d) a transmitting and driving system for transmitting rotation of said motor to said film winding-up member;
   (e) winding-up stopping means for stopping rotation of said motor and said transmitting and driving system each time a film has been wound up by a prescribed number of frames; and
   (f) backward motion driving means for driving at least said transmitting and driving system to rotate to a few degrees of angle in the reversed direction to that in which it rotated when in winding at a time after the film has been wound up by the prescribed frame and before the initiation of the next film frame winding operation.

2. The mechanism according to claim 1, wherein said winding-up stopping means includes a rotary cam having a cam displacement formed in a stopped position as it moves along with said transmitting and driving system, and a winding stop lever slidingly contacting with said rotary cam.

3. The mechanism according to claim 1, wherein said backward motion driving means is operated each time the winding of film by one frame is completed.

4. The mechanism according to claim 1, further comprising:

(g) voltage detecting means for detecting the voltage of an electrical power source or battery of the camera.

5. The mechanism according to claim 4, wherein the voltage detection by said voltage detecting means is made carried out when said backward motion driving means is operated.

6. The mechanism according to claim 1, wherein the operation of said backward motion driving means is carried out in the early stage of a releasing operation.

7. A motor driven winding-up mechanism for a camera comprising:
   (a) a reversible motor;
   (b) a drive circuit for rotating said reversible motor in a winding direction;
   (c) a film winding-up member;
   (d) a transmitting and driving system for transmitting rotation of said motor to said film winding-up member;
   (e) winding-up stopping means for stopping rotation of said motor and said transmitting and driving system each time a film has been wound up by a prescribed number of frames; and
   (f) backward motion driving means for rotating said reversible motor to a few degrees of angle in a reversed direction to that when in winding up at a time from the moment at which a film has been stopped from advancing through the length of a preset number of frames until the initiation of winding up of the next frame.

8. The mechanism according to claim 7, wherein said winding-up stopping means includes a rotary cam having a cam displacement formed in a stopped position as it moves along with said transmitting and driving system, and a winding stop lever slidingly contacting with said rotary cam.

9. The mechanism according to claim 7, wherein said backward motion driving means is operated each time the winding of film by one frame is completed.

10. The mechanism according to claim 7, further comprising:
    (g) a clutch provided at an intermediate point in said transmitting and driving system and operating to connect all said transmitting and driving system when said reversible motor rotates in a winding direction; and
    (h) a film rewind driving system arranged to connect with said clutch when said reversible motor is rotated in a reversed direction to that when in winding up.

11. The mechanism according to claim 10, wherein said clutch is made to be a planetary clutch.

* * * * *